(12) United States Patent
Horning et al.

(10) Patent No.: US 6,487,036 B1
(45) Date of Patent: Nov. 26, 2002

(54) VIBRATORY FEEDER FOR DISPENSING BALANCE CORRECTION MEMBERS FOR SECURING TO A DISC DRIVE DISC PACK

(75) Inventors: Stephen G. Horning, Oklahoma City, OK (US); Roger A. Jessen, Norman, OK (US); Thomas H. Chuang, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 161 days.

(21) Appl. No.: 09/641,691

(22) Filed: Aug. 18, 2000

Related U.S. Application Data
(60) Provisional application No. 60/150,143, filed on Aug. 20, 1999.

(51) Int. Cl.$^7$ ............................................. G11B 33/14
(52) U.S. Cl. ................................ 360/97.01; 360/99.08
(58) Field of Search ........................... 360/97.01, 99.12; 29/742, 759, 834–835; 156/538, 542, 556, 557, 569

(56) References Cited

U.S. PATENT DOCUMENTS

| | | |
|---|---|---|
| 3,194,392 A | 7/1965 | Manderbach |
| 3,482,612 A | 12/1969 | Larsen |
| 4,651,869 A | 3/1987 | Grief |
| 4,751,863 A | 6/1988 | Watanabe |
| 4,811,835 A | 3/1989 | Bullivant et al. |
| 5,060,784 A | 10/1991 | Ogawa |
| 5,184,716 A | 2/1993 | Gaines |
| 5,404,636 A | 4/1995 | Stefansky et al. |
| 5,865,297 A | 2/1999 | Chiba et al. |
| 5,871,082 A | 2/1999 | Kando et al. |
| 5,873,159 A * | 2/1999 | Arya ....................... 29/603.03 |
| 6,266,869 B1 * | 7/2001 | Tracy .......................... 29/740 |
| 6,332,942 B1 * | 12/2001 | Hector .................... 156/273.7 |
| 6,356,409 B1 * | 3/2002 | Price ...................... 360/98.07 |

FOREIGN PATENT DOCUMENTS

| | | | |
|---|---|---|---|
| JP | 2000-308306 | * 11/2000 | ............. 360/97.02 |

* cited by examiner

Primary Examiner—A. J. Heinz
(74) Attorney, Agent, or Firm—Fellers, Snider, et al.

(57) ABSTRACT

A vibratory feeder having a component rod assembly with a component key, a component rod and a component load ramp configured to support balance correction members, a vibrator assembly advancing the balance correction members along the component rod assembly to an escapement assembly with an escapement blade allowing one balance correction member at a time to progress onto a component stop which stages and releases the balance correction member into the gravity feed chute that transports the balance correction member to confinement within a component retainer and on to an air activated shutter that dispenses the balance correction member upon activation of a shutter air slide. The vibrator assembly includes a vibration source motor mounted at the center of mass of the vibratory feeder assembly.

16 Claims, 8 Drawing Sheets

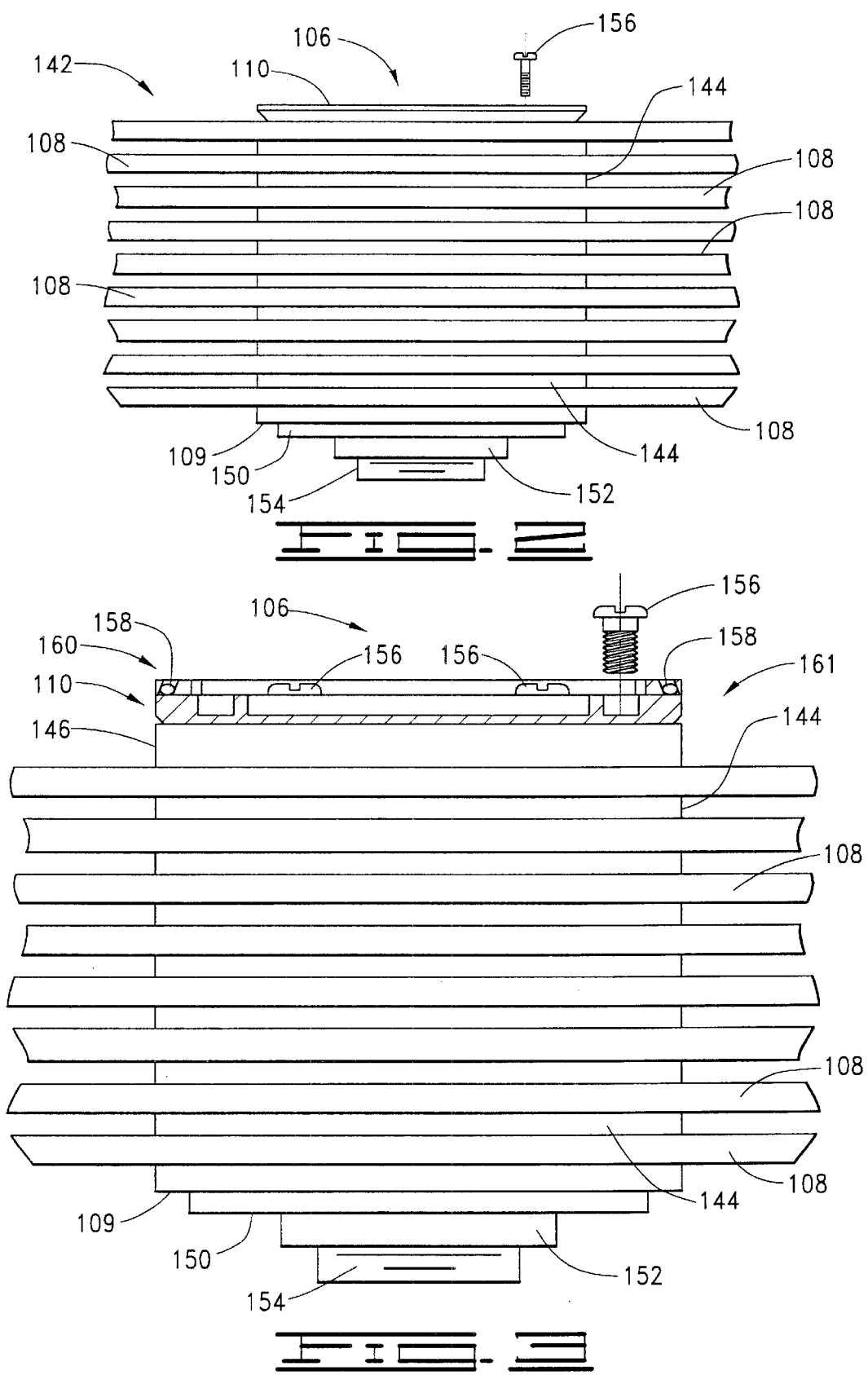

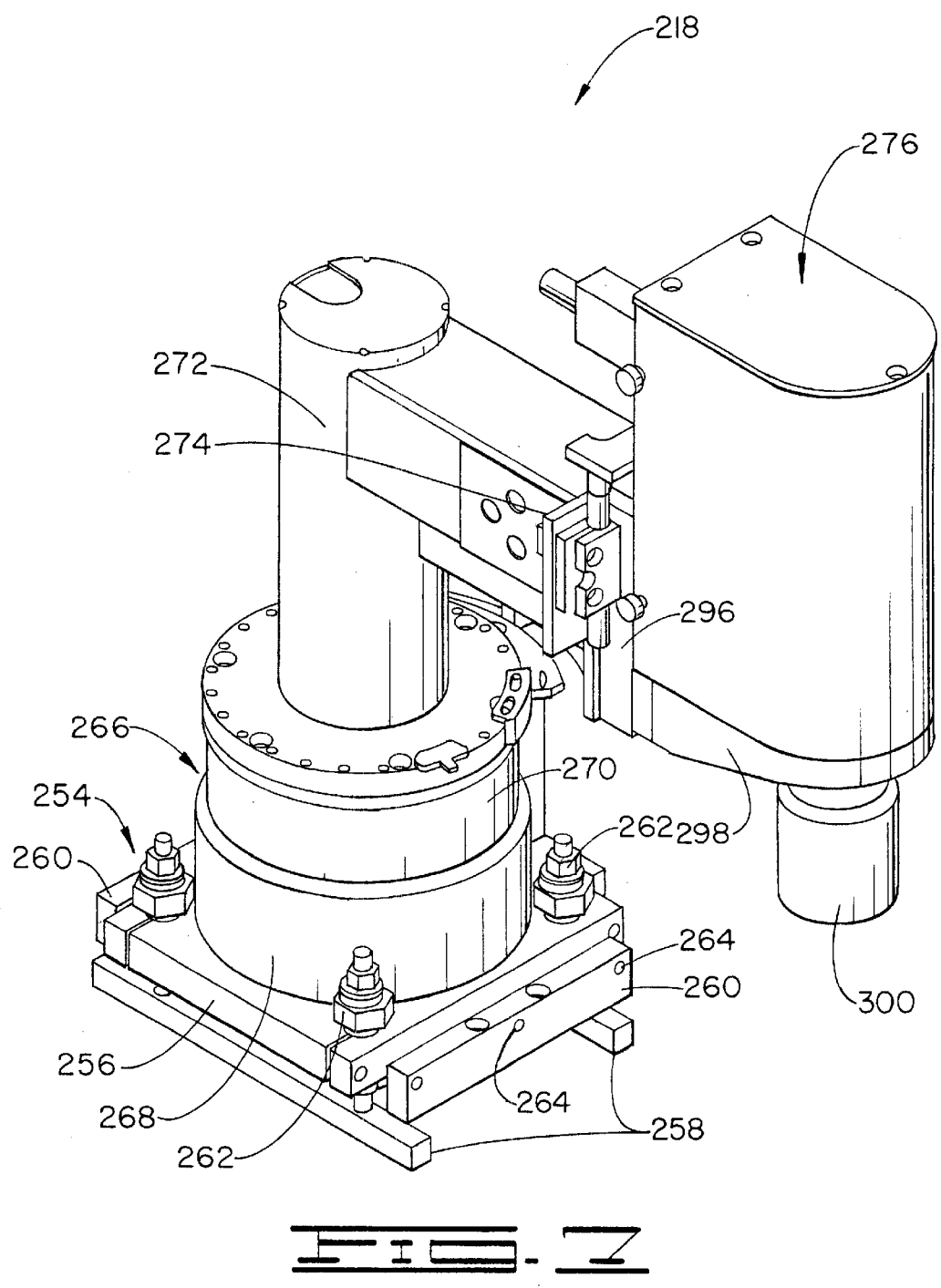

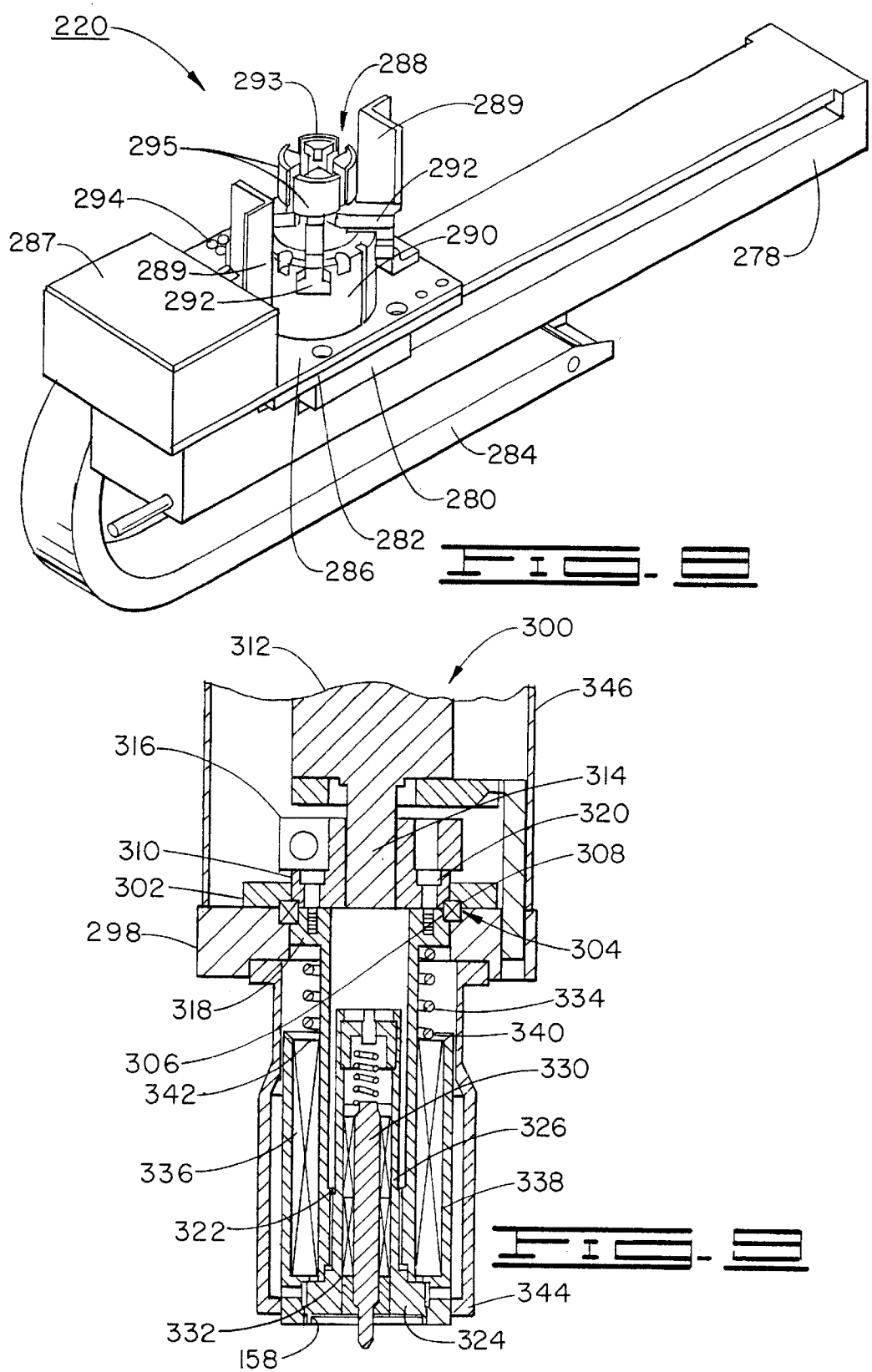

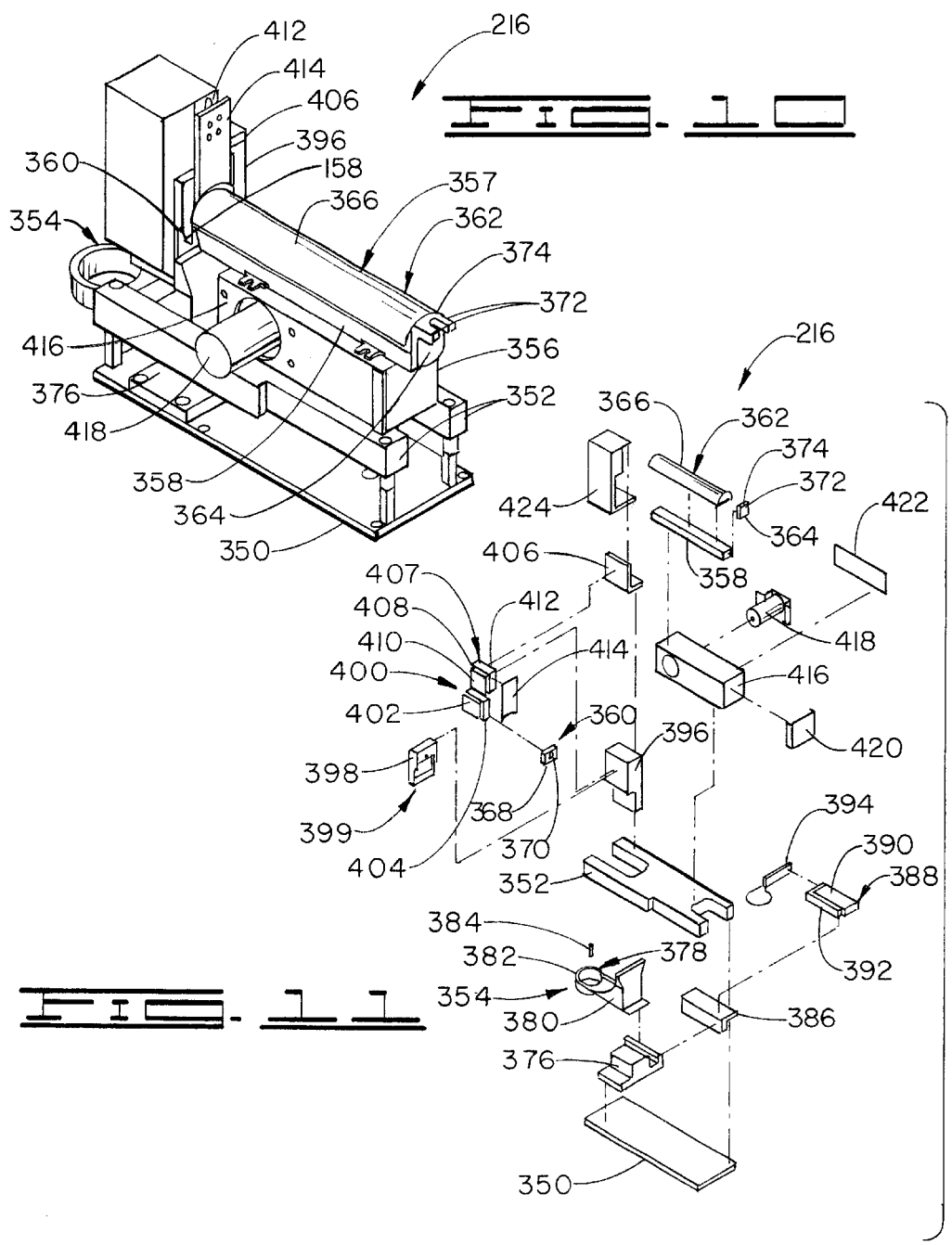

VIBRATORY FEEDER FOR DISPENSING BALANCE CORRECTION MEMBERS FOR SECURING TO A DISC DRIVE DISC PACK

RELATED APPLICATIONS

This application claims priority to U.S. Provisional Application No. 60/150,143 filed Aug. 20, 1999.

FIELD OF INVENTION

The present invention relates generally to the field of disc drive data storage devices, and more particularly, but not by way of limitation, to an automated assembly of a disc drive head-disc assembly which includes an automated balance correction station with a vibratory feeder for balance correction members.

BACKGROUND

Modern hard disc drives are commonly used in a multitude of computer environments ranging from super computers through notebook computers to store large amounts of data in a form that can be made readily available to a user. Typically, a disc drive comprises one or more magnetic discs that are rotated by a spindle motor at a constant high speed. The surface of each disc serves as a data recording surface and is divided into a series of generally concentric recording tracks radially spaced across a band between an inner diameter and an outer diameter. The data tracks extend around the disc and data is stored within the tracks on the disc surface in the form of magnetic flux transitions. The flux transitions are induced by an array of transducers otherwise commonly called read/write heads. Typically, each data track is divided into a number of data sectors that store fixed sized data blocks.

Each read/write head includes an interactive element such as a magnetic transducer which senses the magnetic transitions on a selected data track to read the data stored on the track. Alternatively, the read/write head transmits an electrical signal that induces magnetic transitions on the selected data track to write data to the track. As is known in the art, the read/write heads are supported by rotary actuator arms and are positioned by the actuator arms over a selected data track to either read or write data. The read/write head includes a slider assembly having an air-bearing surface that causes the read/write head to fly relative to the disc surface. The air bearing is developed by load forces applied to the read/write head by a load arm interacting with air currents produced by disc rotation.

Typically, several open-centered discs and spacer rings are alternately stacked on the hub of a spindle motor, followed by the attachment of a clampring to form a disc pack. The hub, defining the core of the stack, serves to align the discs and spacer rings around a common centerline. Movement of the discs and spacer rings is typically constrained by a compressive load maintained by the clampring. The complementary actuator arms of an actuator assembly, commonly called an E-block, support the read/write heads to access the surfaces of the stacked discs of the disc pack. The read/write heads communicate electronically with a printed circuit board assembly (PCB) through read/write wires and a flex circuit attached to the E-block. When the E-block is merged with the disc pack into a base deck and a cover is attached to the base deck, a head-disc assembly (HDA) is formed. For a general discussion of E-block assembly techniques, see U.S. Pat. No. 5,404,636 issued to Stefansky et al. and assigned to the assignee of the present invention.

The head-disc assembly (HDA) of a disc drive is typically assembled in a clean room environment. A clean room environment (free of contaminants of 0.3 micron and larger) is necessary to ensure that the head-disc interface remains unencumbered and damage free. The slightest damage to the surface of a disc or read/write head can result in a catastrophic failure of the disc drive. The primary causes of catastrophic failure, particularly read/write head crashes (a non-recoverable, catastrophic failure of the disc drive), are generally characterized as contamination, exposure to mechanically induced shock and non-shock induced damage. The source of non-shock induced damage is typically traced to the assembly process, and generally stems from handling damage sustained by the disc drive during the assembly process.

Several factors that bear particularly on the problem of assembly process induced damage are the physical size of the disc drive, the spacing of the components, the recording densities sought to be achieved and the level of precision to be maintained during the assembly process. The high levels of precision required by the assembly process are necessary to attain the operational tolerances required by the disc drive. The rigorous operational tolerances are in response to market demands that have driven the need to decrease the physical size of disc drives while simultaneously increasing disc drive storage capacity and performance characteristics.

Demands on disc drive mechanical components and assembly procedures have become increasingly more critical in order to meet the strenuous requirements of increased capability and size reduction in the face of these new market demands. Part-to-part variations in critical functional attributes in the magnitude of micro-inches can result in disc drive failures. Additionally, as disc drive designs continue to require size reduction, smaller read/write heads, thinner substrates, longer and thinner actuator arms, and thinner gimbal assemblies must continue to be incorporated into the drives. This trend significantly exacerbates the need to improve assembly processes to protect the read/write heads and discs from damage resulting from incidental contact between mating components. The aforementioned factors resultantly increase the difficulty of assembling disc drives, and as the assembly process becomes more difficult, the need to invent new tools, methods and control systems to deal with the emerging complexities pose unique problems in need of solutions.

Coupled with the size and performance demands is the further market driven requirement forever increasing fault free performance. The progression of continually thinner disc thickness and tighter disc spacing, together with increasing track density and increasing numbers of discs in the disc pack, has resulted in a demand for tools, methods and control systems of ever increasing sophistication. A result has been a decreasing number of assembly tasks involving direct operator intervention. Many of the tasks involved in modem methods are beyond the capability of operators to reliably and repeatedly perform, further driving the need for automated equipment and tooling.

In addition to the difficulties faced in assembling modem disc drives of high capacity and complex, physical product performance requirements have dictated the need to develop new process technologies to ensure compliance with operating specifications. The primary factors driving more stringent demands on the mechanical components and the assembly process are the continually increasing areal densities and data transfer rates of the disc drives.

The continuing trend in the disc drive industry is to develop products with ever increasing areal densities, decreasing access times and increasing rotational speeds. The combination of these factors places greater demands on the ability of modern servo systems to control the position of read/write heads relative to data tracks. The ability to assemble HDAs nominally free from the effects caused by unequal load forces on the read/write heads, disc pack imbalance or one of the components of runout, velocity and acceleration (commonly referred to as RVA) poses a significant challenge as track densities increase. The components of RVA are disc runout (a measure of the motion of the disc along the longitudinal axis of the motor as it rotates); velocity (a measure of variations in linear speed of the disc pack across the surface of the disc); and acceleration (a measure of the relative flatness of the discs in the disc pack). By design, a disc drive typically has a discrete threshold level of resistance to withstand rotationally induced noise and instability, below which the servo system is not impaired. Also, a fixed range of load forces must be maintained on the read/write head to ensure proper fly height for data exchange. The operating performance of the disc drive servo system is affected by mechanical factors beyond the effects of mechanically induced read/write head oscillation from disc surface anomalies. Errors are traceable to disc pack imbalance and RVA noise sources. Even with improved approaches to the generation of position error signals in the disc drive servo system, the ability of the system to deal with such issues is finite. The limits of the servo system capability to reliably control the position of the read/write head relative to the data track must not be consumed by the noise present in the HDA resulting from the assembly process. Consumption of the available margin by the assembly process leaves no margin in the system to accommodate changes in the disc drive attributes over the life of the product. An inability to accommodate changes in the disc drive attributes leads to field failures and an overall loss in product reliability, a detrimental impact to product market position.

An additional area of concern, and a problem faced by disc drive producers, is the exposure of the discs and heads to sub-micron particles and particulate generation during the assembly process of the disc drive. Clean rooms are typically used as the assembly setting for disc drive production. Great efforts are taken to minimize the potential of contamination throughout most aspects of the mechanical assembly process. Vibratory part feeders have been used in non-clean room assembly operations for some time, however traditional vibratory part feeders are prolific particulate generators and present significant contamination problems when introduced into clean rooms. Failure to maintain contamination controlled clean room assembly facilities has been linked to subsequent disc damage and again, the slightest damage to the surface of a disc or read/write head can result in a catastrophic failure of the disc drive.

While the use of balance correction members to correct disc drive imbalance is known, there persists a need for optimization and control to assure consistent and reliable use of balance correction in modern high performance disc drives.

Thus, in general, there is a need for an improved approach to disc drive-assembling technology to minimize the potential of damage during assembly, to produce product that is design compliant and reliable, and to minimize mechanically induced system noise. One such need is for a load force optimized balance correction vibratory feeder capable of dispensing the load force optimized balance correction members while minimizing particulate matter generation.

SUMMARY OF THE INVENTION

The present invention provides a vibratory feeder for advancing and dispensing balance correction members used to correct rotational imbalance of a disc drive, the vibratory feeder assembly having a component rod assembly configured to substantially conform to balance correction members of specific mass and maintain sliding alignment of the balance correction members. A vibration unit disposed at the center of gravity of the vibratory feeder intermittently vibrates the component rod assembly to selectively advance the balance correction members.

To dispense the balance correction members, a sliding component stop, a component wiper, an escapement blade and a component retainer with a release shutter are provided. Upon activation, the escapement blade lifts and a single balance correction member advances into position on the sliding component stop. The escapement blade lowers to prevent advancement of the remaining balance correction members. With a single balance correction member in place, the sliding component stop slides past the component wiper which wipes the balance correction member off the sliding component stop and deposits the balance correction member into the component retainer where the air slide activated shutter removes the balance correction member from the component retainer.

These and other features and advantages which characterize the present invention will be apparent from a reading of the following detailed description and a review of the associated drawings.

BRIEF DESCRIPTION OF THE DRAWINGS

FIG. 2 is an elevational view of the spindle motor of the disc drive of FIG. 1 having a plurality of discs and spacers mounted and secured thereon via a clampring to form a disc pack.

FIG. 3 is a partial cutaway, elevational view of a balance corrected disc pack with a cross-sectional view of the clampring and installed balance correction member.

FIG. 6 is an exploded perspective view of a dynamic balance correction station constructed in accordance with the present invention and utilized to install the clampring of FIG. 4.

FIG. 7 is a perspective view of a pick and place manipulator assembly of the balance correction station of FIG. 6

FIG. 8 is an exploded perspective view of a component capture and transfer assembly of the balance correction station of FIG. 6

FIG. 9 is a cross-sectional view of an end effector of the pick and place manipulator assembly of FIG. 7.

FIG. 10 is a perspective view of a vibratory feeder assembly of the automated disc drive assembly station of FIG. 4.

FIG. 11 is an exploded, perspective view of the vibratory feeder assembly of the automated disc drive assembly station of FIG. 9.

DETAILED DESCRIPTION

Figure 1:
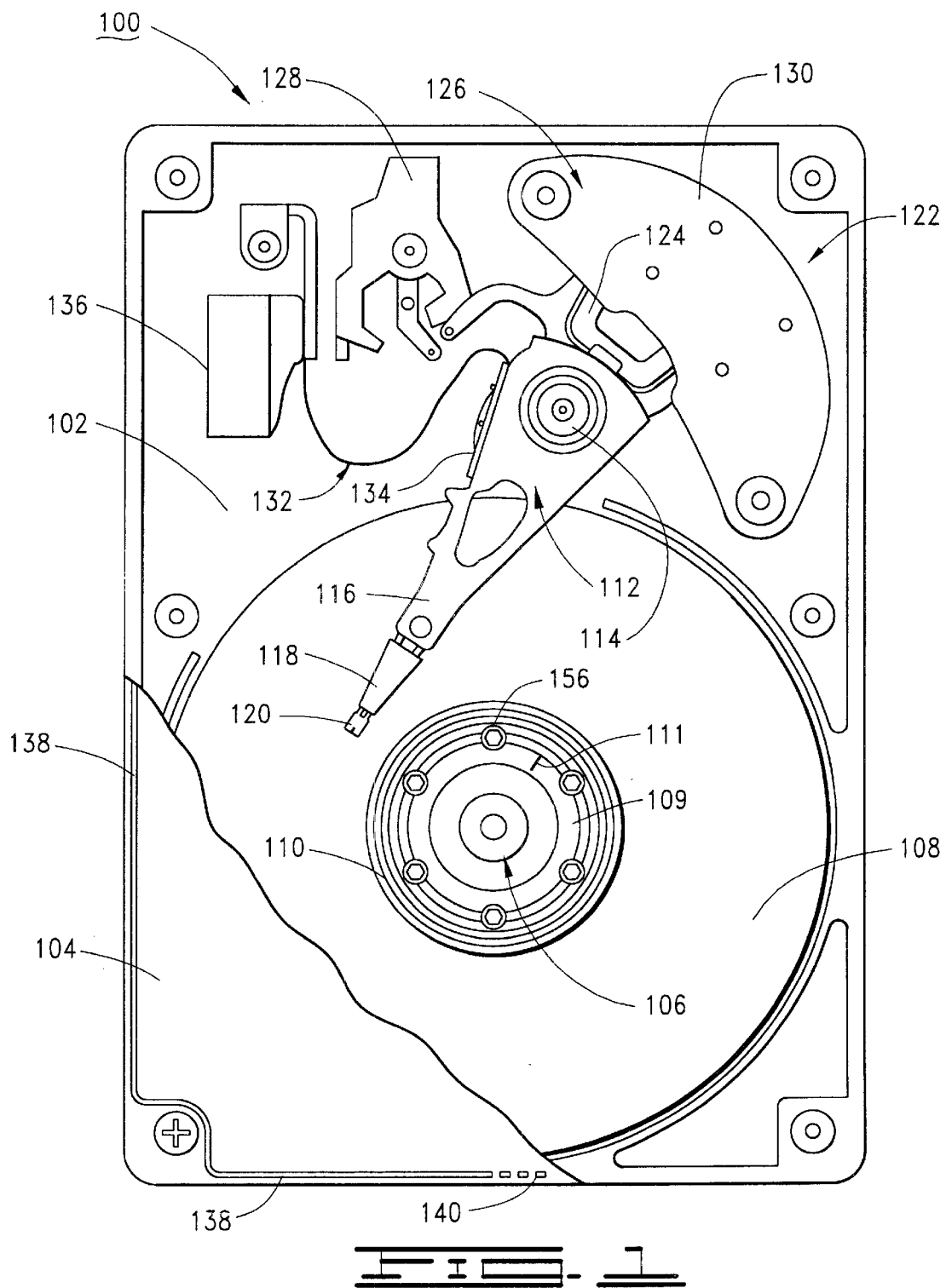
FIG. 1 is a top, partially cutaway view of a disc drive assembled by an automated disc drive assembly incorporating a vibratory feeder for balance correction members and constructed in accordance with the present invention.

Referring to the drawings in general, and more particularly to FIG. 1, shown therein is a top view of a disc drive 100 constructed in accordance with the present invention. The disc drive 100 includes a basedeck 102 to which various disc drive components are mounted, and a top cover 104 (shown in part) which together with the basedeck 102 provides a sealed internal environment for the disc drive 100. Numerous details of construction of the disc drive 100 are not included in the following description as such are well known to those skilled in the art and are believed to be unnecessary for the purpose of describing the present invention.

Mounted to the basedeck 102 is a spindle motor 106 to which several discs 108 are mounted on a spindle motor hub 109 and secured by a clampring 110 for rotation at a constant high speed. In addition to providing support for the stacked discs 108, the spindle motor hub 109 also provides a timing mark 111 used during the assembly process to reference the angular location of a source of rotational imbalance. Adjacent the discs 108 is an actuator assembly 112 (also referred to as an "E-block") which pivots about a cartridge bearing 114 in a rotary fashion. The actuator assembly 112 includes actuator arms 116 (only one shown) that support load arms 118. Each load arm 118 supports read/write heads 120, with each of the read/write heads 120 corresponding to a surface of one of the discs 108. As mentioned, each of the discs 108 has a data recording surface divided into concentric circular data tracks, and the read/write heads 120 are positionably located over data tracks to read data from, or write data to, the tracks.

The actuator assembly 112 is controllably positioned by a voice coil motor assembly (VCM) 122, comprising an actuator coil 124 immersed in the magnetic field generated by a magnet assembly 126. A latch assembly 128 latches the actuator assembly in a predetermined park position when the disc drive 100 is turned off A magnetically permeable flux path is provided by a steel plate 130 (also called a pole piece) mounted above the actuator coil 124 to complete the magnetic circuit of the VCM 122.

When controlled DC current is passed through the actuator coil 124, an electromagnetic field is set up which interacts with the magnetic circuit of the VCM 122 to cause the actuator coil 124 to move relative to the magnet assembly 126 in accordance with the well-known Lorentz relationship. As the actuator coil 124 moves, the actuator assembly 112 pivots about the cartridge bearing assembly 114, causing the heads 120 to move over the surfaces of the discs 108 thereby allowing the heads 120 to interact with the data tracks of the discs 108.

To provide the requisite electrical conduction paths between the heads 120 and disc drive read/write circuitry (not shown), read/write head wires (not separately shown) are routed on the actuator assembly 112 from the heads 120 along the load arms 118 and the actuator arms 116 to a flex circuit 132. The read/write head wires are secured to corresponding pads of a flex circuit printed circuit board (PCB) 134 of the flex circuit 132. The flex circuit 132 is connected to a flex circuit bracket 136 in a conventional manner, which is connected through the basedeck 102 to a disc drive PCB (not shown) mounted to the underside of the basedeck 102. The disc drive PCB provides the disc drive read/write circuitry which controls the operation of the heads 120, as well as other interface and control circuitry for the disc drive 100.

To maintain the sealed internal environment for the disc drive 100, a seal gasket 138 is molded onto the top cover 104. Top cover 104 has a plurality of gasket attachment apertures 140 through which gasket material flows during the gasket molding process. A continuum of symmetrically formed gasket material is disposed on both the top and bottom surfaces of the top cover 104 and injected through the apertures 140. During the cure process, the gasket material injected into the gasket attachment apertures 140 bonds the portion of the seal gasket adjacent the top surface of the top cover 104 to the portion of the seal gasket adjacent the bottom portion of the top cover 104, thereby sealing the gasket attachment apertures 140 and forming the seal gasket 138. A gasket material found to be useful for this application is FLUOREL by the 3 M company, and more specifically, 3 M FLUOREL, FE- 5621Q.

Shown in FIG. 2 is a disc pack 142 that includes alternately stacked discs 108 and spacer rings 144 in the manner of a traditional disc pack on the spindle motor hub 109. The spindle motor hub 109 is attached to the spindle motor 106 via a motor housing 150 that supports an outer race 152, where the motor housing 150 and outer race 152 together spin freely around a stationary threaded shaft 154 by interior roller bearings (not shown) therebetween.

Upon completing the stacking of discs 108 interleaved with the spacer rings 144, with the last stacked component typically being the top disc 108, the clampring 110 is secured to the spindle motor hub 109 by the hardware pieces or fasteners 156. The spindle motor hub 109 provides a component-mounting surface (not separately shown) containing an appropriate number of attachment apertures (not specifically shown) with each fastener 156 engaging one attachment aperture to secure the clampring 110 to the spindle motor hub 109, thereby completing the disc pack 142.

Figure 4:
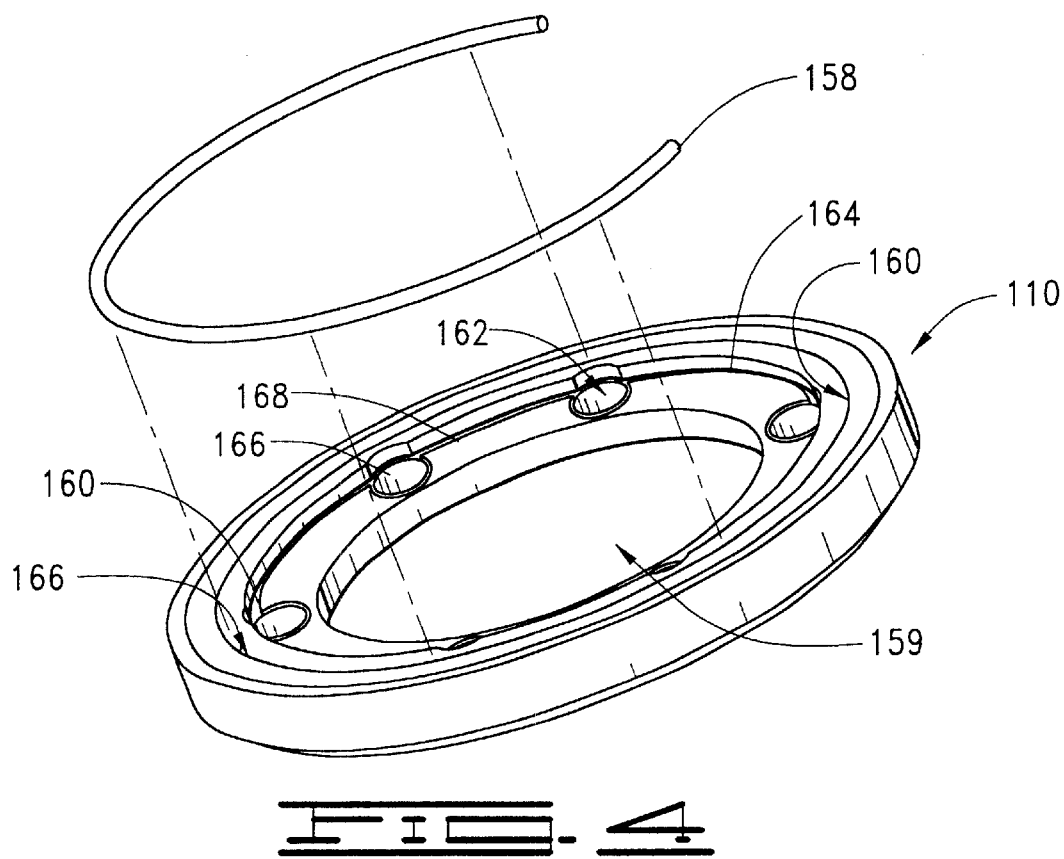
FIG. 4 is a perspective view of the balance correction member and clampring of FIG. 3.

While assembling the disc pack 142, the first component placed on the spindle motor hub is usually one of the discs 108. However, as shown by FIG. 3 the last stacked part that is placed on the spindle motor hub 109 can be an enlarged spacer ring 146 rather than a disc. The enlarged stack ring 146 has a diameter substantially equal to that of the spacer rings 144 and a thickness substantially equal to the sum of the thickness of the spacer ring 144 plus the thickness of the disc 108. Whether the last stacked part is a disc or the enlarged stack ring 146, the clampring 110 imparts a clamping force on the top surface of the last stacked member. The applied clamp force secures the discs 108 of the disc pack 142 in a fixed position for the operational life of disc drive 100. Additionally, FIG. 4 shows a balance correction member 158 which is disposed within an annular balance correction containment cavity 160 of the clampring 110 when assembled thereto. Proper placement of the balance correction member 158 within the annular balance correction containment cavity 160 results in the formation of a balance corrected disc pack 161.

FIG. 4 is an illustration of the balance correction member 158 which is a C-shaped wire-ring and which is also sometimes herein referred to herein as a balance correction C-shaped wire-ring. To assure shape retention and to instill a spring action response to externally applied forces, the balance correction member 158 is made from full hard 302 stainless steel wire.

As shown in FIG. 4, the clampring 110 has a central bore 159, an annular balance correction containment cavity 160 and six hardware ports 162 that extend through the clampring, 110 and that are spaced symmetrically about the central bore 159. A compressive force distribution surface 164, a relief surface 166 and a step portion 168 are provided as shown. Each hardware port 162 directly corresponds to attachment apertures (not separately shown) in the spindle motor hub 109, and each of the fasteners 156 is disposed to extend through one of the hardware ports 162. The force distribution surface 164 is elevated above the relief surface 166 by the step portion 168. The step portion 168 has a thickness of about 0.006 inches. By simultaneously applying a final torque to the fasteners 156 during the assembly process, the force distribution surface 164 levels the compressive load across the clampring 110 to assure the surface of the disc 108 remains distortion free.

Figure 5:
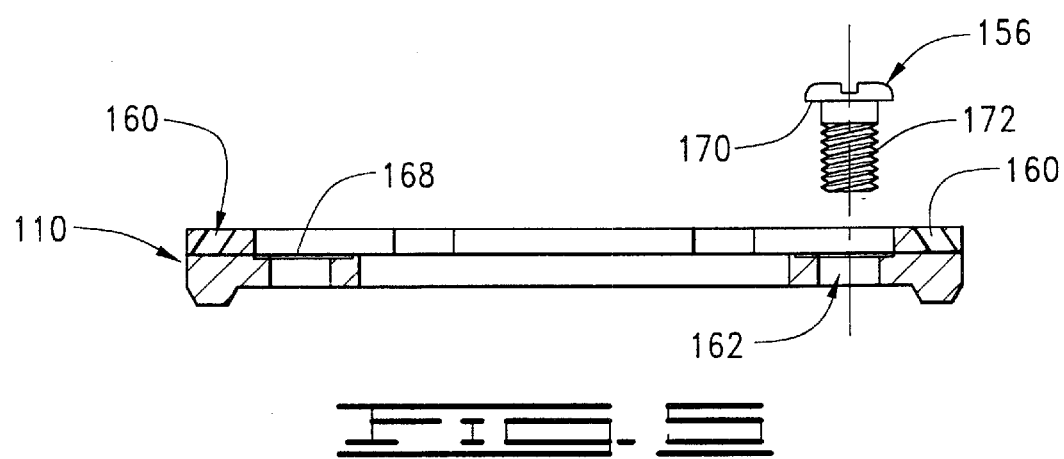
FIG. 5 is a partial elevational, sectional view of the clampring of FIG. 4 showing one of the mating fasteners securing the clampring to the spindle motor hub.
Figure 5:
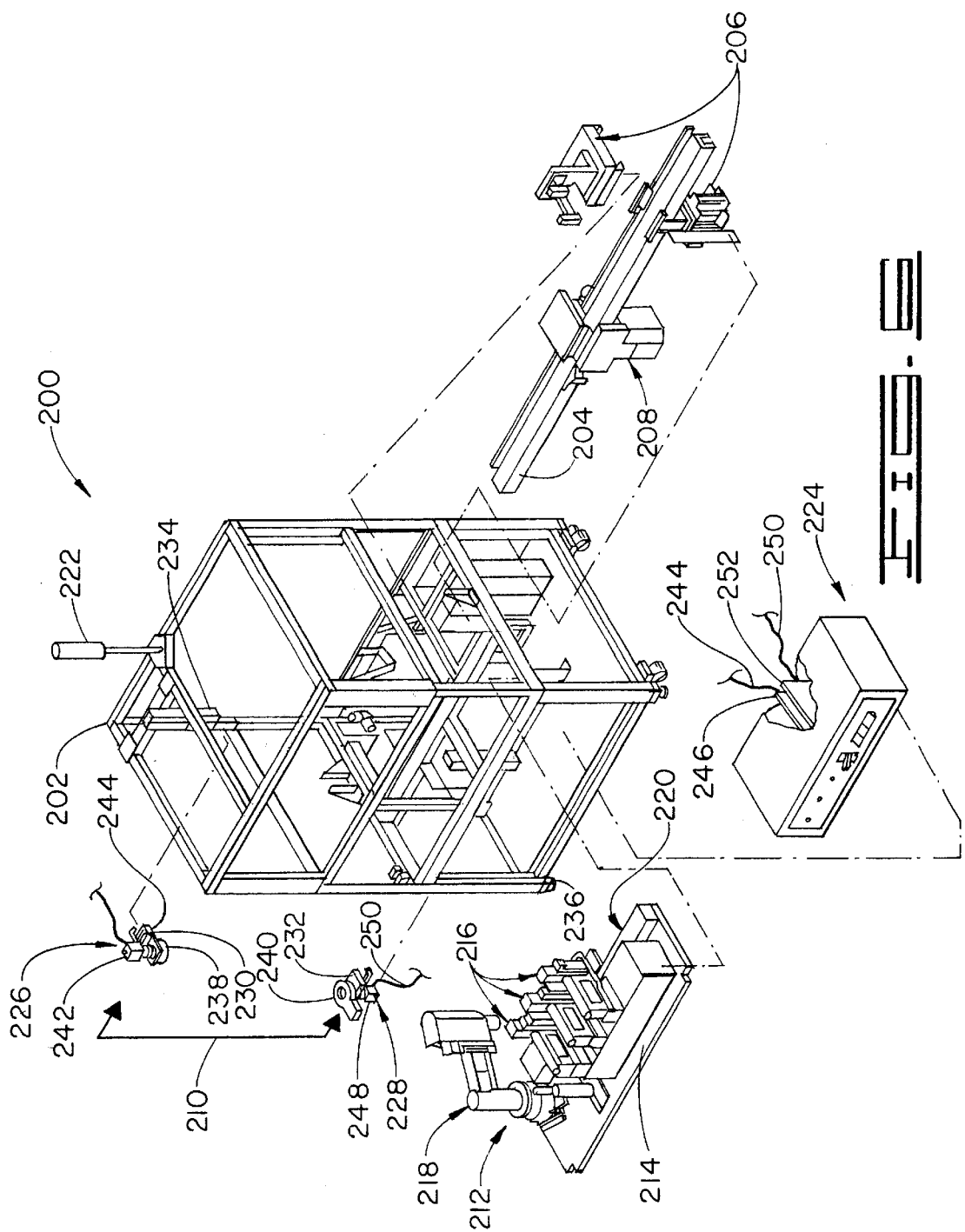

FIG. 5 shows one of the fasteners 156 that secure the clampring 110 to the spindle motor hub 109. Each fastener 156 has a contact surface 170 and a threaded engagement portion 172. Also, FIG. 5 shows the cross-sectional geometry of the annular balance correction containment cavity 160. During the assembly process the balance correction member 158 is placed into a compressed mode while being inserted into the mouth of the annular balance correction containment cavity 160. Upon entry into the mouth of the annular balance correction containment cavity 160, the balance correction member 158 expands, driving the balance correction member 158 to the base of the annular balance correction containment cavity 160. The base of the annular balance correction containment cavity 160 confines the balance correction member 158 and prevents the balance correction member 158 from attaining its free state form, thereby holding the balance correction member 158 in a compressed mode. By holding the balance correction C-shaped wire-ring in a compressed state the annular balance correction containment cavity 160 prevents movement of the balance correction member 158.

As described above, each one of the fasteners 156 directly corresponds to one of the hardware ports 162. The threaded engagement portion 172 of each of the fasteners 156 passes through the corresponding hardware port 162 to engage an attachment aperture. Upon simultaneous application of a final torque force on each fastener 156, the contact surface 170 of the fastener 156 contacts the force distribution surface 164 and imparts a compressive force on the force distribution surface 164 while being prevented from making contact with the relief surface 166. By confining the contact surface 170 to engagement with the force distribution surface 164 as the means of imparting the simultaneously applied compressive load developed by the finally applied torque force, the runout, velocity, and acceleration (RVA) characteristics remain within those limits required by disc drive 100.

Runout of the discs 108 is a measure of the axial variation of the height of the disc 108 surface around a circumferential arc of a specific radius. The velocity component is a measure of the rate of change of the axial displacement of the surface of the disc 108 around a circumferential arc of a specific radius. The acceleration component of RVA is a measure of the rate of change of the velocity of disc 108 around a circumferential arc of a specific radius.

The exploded, perspective view of the balance correction station 200 as shown in FIG. 6 provides a more clear perspective of the associated components thereof. The balance correction station 200 is used in the production of balance corrected disc drives 100. As shown by FIG. 6, a frame 202 supports a plurality of tooling assemblies during the process of attaching the balance correction member 158 (FIG. 4) to the disc pack 142 (FIG. 2). Included in FIG. 6 is a conveyor 204 with an attached lift and balance measurement assembly 206 along with an attached lift and locate assembly 208. The conveyor 204, attached to the frame 202, conveys disc packs 142 awaiting balance measurement into the balance correction station 200. The lift and balance measure assembly 206 measures the amount of imbalance present in the disc pack assembly 142.

For disc packs 142 that are measured and found to be within the tolerance range of acceptability for imbalance, the conveyor 204 transfers those disc packs 142 from the balance correction station 200 to other processing equipment. For disc packs 142 that display an amount of imbalance beyond the correction capabilities of the balance correction station 200, the conveyor 204 transfers the disc packs 142 from the balance correction station 200 to be reworked or discarded. For each disc pack 142 identified by the lift and balance measure assembly 206 as being outside the imbalance tolerance specifications, but within the correction capabilities of the balance correction station 200, the conveyor 204 transfers the disc pack 142 to the lift and locate assembly 208.

The lift and locate assembly 208 positions the disc pack 142 to assure that both a feature detection assembly 210 and a balance correction assembly 212 have access to the disc pack 142. The balance correction assembly 212 utilizes a baseplate 214 to provide the controllable, common mounting plane for several feeder assemblies 216 (also referred to herein as vibratory feeder assemblies). a pick and place manipulator assembly 218 and a component capture and transfer assembly 220. In FIG. 6 three such vibratory feeder assemblies 216 are shown. Each of the vibratory feeder assemblies 216 dispenses a specific geometric configuration of the balance correction members 158. The component capture and transfer assembly 220 is positionable beneath any selected one of the vibratory feeder assemblies 216. The component capture and transfer assembly 220 receives the balance correction members 158 dispensed by the vibratory feeder assemblies 216.

Upon receipt of the balance correction member 158, the component capture and transfer assembly 220 transfers the balance correction member 158 to the pick and place manipulator assembly 218. The pick and place manipulator assembly 218 picks the balance correction member 158 from the component capture and transfer assembly 220 and proceeds to place the balance correction member 158 on the disc pack 142.

Also illustrated in FIG. 6 is a clean room automation technician operational status light pole 222. The status light pole 222 provides a quick reference regarding the status of the balance correction station 200 at any time during operation of the balance correction station 200. The status light pole 222 has a number of colored lamps or lenses. One color is selected to signify that the balance correction station 200 is progressing in a typical manner and processing disc packs 142 unencumbered. A second color is selected to signify that the balance correction station 200 is inoperative and available for receiving and processing disc packs 142. A third color is selected to signify that the balance correction station 200 has encountered difficulty while processing the disc pack 142. This arrangement permits a clean room technician to monitor the status of the balance correction station at a glance. A control computer 224 controls elimination of the status lights of the status light pole 222.

The control computer 224 is mounted in the base portion of the frame 202. The control computer 224 provides digital control and communication with the conveyor 204, the lift and balance measure assembly 206, the lift and locate assembly 208, the feature detection assembly 210 and the balance correction assembly 212. It will be noted that the feature detection assembly 210 has two primary assemblies. The first assembly is a downward focusing digital recognition assembly 226 and the second assembly is an upward focusing digital recognition assembly 228.

A first C-clamp camera attachment member 230 secures the downward focusing digital recognition assembly 226. A second C-clamp camera attachment member 232 secures the upward focusing digital recognition assembly 228. The first C-clamp camera attachment member 230 is secured to a downward focusing vision system mounting plate 234, which is attached to the frame 202. The second C-clamp camera attachment member 232 is attached to an upward focusing vision system mounting plate 236 which is attached to the frame 202. In order to ensure consistency in quality of image information gathered by the feature detection assembly 210, both the downward focusing digital recognition assembly 226 and the upward focusing digital recognition assembly 228 are provided with dedicated light sources. A light source 238 is attached to the first C-clamp camera attachment member 230 to provide the illumination required by the downward focusing digital recognition assembly 226, and a second light source 240 is attached to the second C-clamp camera attachment member 232 to provide the illumination needed by the upward focusing digital recognition assembly 228.

The downward focusing digital recognition assembly 226 includes a first digital video camera 242, a first signal cable 244 and a first digital video capture board 246. The first signal cable 244 attaches the first digital video camera 242 to the first video capture board 246. The upward focusing digital recognition assembly 228 includes a second digital video camera 248, a second signal cable 250 and a second digital video capture board 252. The second signal cable 250 attaches the second digital video camera 248 to the second digital video capture board 252. Each of the digital video capture boards 246 and 252 contains pattern recognition software internal to the control computer 224.

Included in FIG. 7 is a manipulator mounting assembly 254 that has an attachment plate 256, a pair of manipulator clamp bars 258, a pair of centering jack blocks 260, several custom manipulator arm screws 262 and a number of hardware attachment fasteners 264. The attachment plate 256 provides a mounting surface as well as a reference plane to the balance of the components making up the pick and place manipulator assembly 218.

The manipulator clamp bars 258 are connected to the attachment plate 256 by the custom manipulator arms screws 252. The manipulator clamp bars 258 rest on the base plate 214 of the balance correction assembly 212. The centering jack blocks 260 are attached to the attachment plate 256 by the attachment fasteners 264. The centering jack blocks 260 center the pick and place manipulator assembly 218 relative to the base plate 214 of the balance correction assembly 212 and secures the pick and place manipulator assembly 218 to the balance correction assembly 212. The custom manipulator arms screws 252 are configured to allow adjustments for the pitch of a rotary actuator assembly 266 relative to the disc pack 142 held by the lift and locate assembly 208.

The attachment plate 256 serves as the attachment surface for the rotary actuator assembly 266, which has two primary components. The first is a motion controller 268 attached directly to the attachment plate 256 and the second component is a rotary stepper motor 270 connected to the motion controller 268. The rotary stepper motor 270 provides the pick and places manipulator assembly 218 the ability to travel along on an arcuate path in the X–Y plane. The motion controller 268 controls both the speed that the pick and place manipulator assembly 218 traverses through the X–Y plane and the ability of the pick and place manipulator assembly 218 to repeatedly stop accurately at particular points along the arcuate path.

Attached to the rotary stepper motor 270 is a manipulator arm 272 having attached thereto an end effector receiving plate 274 to which an end effector assembly 276 is attached. The manipulator arm 272 defines an initial Z-axis position of the end effector assembly 276, as well as the radius of the arcuate path traveled by the end effector assembly 276. During the operation of the balance correction station 200, the arcuate path traveled by the end effector 267 assures that the end effector assembly 276 communicates with both a disc pack assembly 142 and the component capture and transfer assembly 220.

Included in FIG. 8 is a linear actuator 278 that provides the linear motion required by the component capture and transfer assembly 220 to service each of the several vibratory feeder assemblies 216 during the operation of the balance correction station 200. FIG. 8 further illustrates a positioning plate 280 that is slidingly attached to the linear actuator 278. The positioning plate 280 serves as an attachment host and linear travel vehicle for the remaining components of the component capture and transfer assembly 220. Also shown by FIG. 8 are a transition plate 282 attached to the positioning plate 280, a flexible cable-way 284 attached to the transition plate 282, a gripper mount plate 286 attached to the transition plate 282, a cover 287 attached to the gripper mount plate 286, a ring expanding gripper assembly 288 attached to the gripper mount plate 286 and a pair of sensor mounts 289 attached to the gripper mount plate 286.

The mounting hole pattern (not shown) of the ring expanding gripper assembly 288 is not the same as the mounting hole pattern (not shown) of the positioning plate 280. As such, the transition plate 282 provides an appropriate mounting hole pattern (not shown) for attaching the transition plate 282 to the positioning plate 280. The transition plate 282 further provides a hole pattern (not shown) for attaching the gripper mount plate 286 to the transition plate 282. The gripper mount plate 286 provides the ability to adjust the pitch of the ring expanding gripper assembly 288 to be consistent with the pitch of the end effector assembly 276. The sensor mounts 289 are the structures for mounting sensors (not shown) that detect the presence of the end effector assembly 276 while the cover 287 contributes to the maintenance of the clean room environment by containing particulate generation that occurs during the operation of the balance correction station 200.

FIG. 8 further shows the primary components of the ring expanding gripper assembly 288 including the gripper base 290 that is attached to the gripper mount plate 286. The gripper base 290 supports several gripper sections 292, the number of gripper sections 292 being a function of the particular component handled by the balance correction station 200. In FIG. 8, the number of gripper sections 292 is four as determined by the configuration of the balance correction member 158. Each of the gripper sections 292 is slidingly mounted to the gripper base 290 and attached to a pneumatic cylinder 294. The gripper sections 292 provide the ring expanding gripper assembly 288 the ability to form a variable diameter annular balance correction containment cavity 293.

During operation of the balance correction station 200, the most prominent diameters for the variable diameter annular balance correction containment cavity 293 are the maximum diameter and the minimum diameter. The maximum diameter of the variable diameter annular balance correction containment cavity 293 is defined when the pneumatic cylinder 294 is at maximum stroke in a first direction.

The minimum diameter annular balance correction containment cavity 293 is defined when the pneumatic cylinder 294 is at maximum stroke in a second and opposite direction from that of the first maximum stroke position.

Slidingly attached to each of the other gripper sections 292 is a spring-loaded retractable component containment member 295. Collectively the spring-loaded retractable component containment members 295 form a containment wall (not separately shown) of the variable diameter annular balance correction containment cavity 293.

In cooperating with the end effector assembly 276 during the transfer of the balance correction member 158, the spring-loaded retractable component containment members 295 yield to the end effector assembly 276. By yielding, the spring-loaded retractable component containment members 295 allow the balance correction member 158 to expand slightly and pressingly engage the end effector assembly 276.

Returning to FIG. 7, the end effector assembly 276 has three main components: a Z-axis air slide 296, an angle plate 298 and an end effector 300. The Z-axis air slide 296 provides the coupling between the end effector receiving plate 274 and the second primary component the angle plate 298. Additionally, the Z-axis air slide 296 facilitates the vertical travel required by the pick and place manipulator assembly 218 during the operation of the balance correction station 200. The angle plate 298 provides the structure for attaching the third primary component of the end effector assembly 276, the end effector 300.

A detailed view of the mechanics of the end effector 300 is shown in FIG. 9. Included in FIG. 9 is a view of the angle plate 298, an outer race clamp 302 attached to the angle plate 298, a motor hub bearing assembly 304 with an inner race 306 and an outer race 308 disposed within the end effector 300 to bring the outer race 308 into pressing engagement with the outer race clamp 302. The inner race 306 is in pressing engagement with a motor hub 310. The motor hub bearing assembly 304 provides the ability of the motor hub 310 to rotate freely in relation to the angle plate 298. FIG. 9 also shows a rotary indexing motor 312 with an attached rotatable shaft 314. The rotatable shaft 314 is held in compressive engagement with the motor hub 310 by a hub clamp 316. In addition to engaging the outer race clamp 302, the outer race 308 engages the angle plate 298, while the inner race 306 engages a cylindrical plunger housing 318. As shown, the cylindrical plunger housing 318 is attached to the motor hub 310 by shoulder screws 320.

The internal wall of the cylindrical plunger housing 318 has a cylindrical plunger retention member 322, which retains a cylindrical plunger 324. The cylindrical plunger 324 has a retention groove 326 that engages the retention in member 322 of the cylindrical plunger housing 318. FIG. 9 also shows a spring-loaded centering shaft 330 protruding through the center portion of the cylindrical plunger 324. The spring-loaded centering shaft 330 centers the disc pack 142 during the operation of the automation distress assembly station 200. The stability of the spring-loaded centering shaft 330 is maintained by the alignment bearing assembly 332.

Enclosing a portion of the outer wall of the cylindrical plunger housing 318 is a plunger compression spring 334 that maintains sliding clearance with the outer wall of the cylindrical plunger housing 318. In addition to the plunger compression spring 334 being adjacent the outer wall of the cylindrical plunger housing 318, a plunger bearing assembly 336 maintains sliding engagement with the outer wall of the cylindrical plunger housing 318. The outer race of the plunger bearing assembly 336 maintains pressing contact with a component retainer 338. The plunger bearing assembly promotes minimal drag between the component retainer 338 and the cylindrical plunger housing 318 as the component retainer 338 slides along the cylindrical plunger housing 318 during the operation of the balance correction station 200. The component retainer 338 also provides a locking ring retainer groove 340 that confines a locking ring 342.

The locking ring 342 serves a dual purpose. The first purpose for inclusion of the locking ring 342 within the end effector 300 is to restrict the movement of the plunger bearing assembly 336 during the operation of the balance correction station 200. The second is to provide a support for the compression spring 334. The compression spring 334 imparts a compressive load needed to ensure proper functioning of the end effector 300 during operation of the balance correction station 200, and the locking ring 342 facilitates the load absent damage to the plunger bearing assembly 336. The plunger compression spring 334 permits travel of the component retainer 338 in the direction of the shoulder screws 320, whereas the cylindrical plunger 324 restricts travel of the component retainer 338 when the cylindrical plunger 324 in moving in a direction away from the shoulder screws 320.

To maintain a clean environment in the clean room during the operation of the balance correction station 200, two additional components of the end effector 300 are shown in FIG. 9. A vacuum housing 344 is attached to the angle plate 298 that in conjunction with a vacuum line (not shown), provides a channel for removal of all particulate matter generated in and around the component retainer 338 during operation of the balance correction station 200. Similarly, a motor cover 346 in concert with another vacuum line (not shown) provides a channel and method for removal of particulate matter generated by the rotary indexing mortar 312 and the components associated with the rotary indexing mortar 312. The removal of the generated particulate matter is ongoing during the operation of the balance correction station 200.

FIG. 10 shows a vibratory feeder assembly 216 of the balance correction assembly 212 (FIG. 6). The vibratory feeder assembly 216 has a vibrator base 350 that supports a vibrator assembly 352 and a chute assembly 354. Included in the vibrator assembly 352 is a mass plate 356, which supports a component rod assembly 357 that supports and transports a supply of the balance correction members 158. The component rod assembly 357 has a component key 358 communicating with a sliding component stop 360, a component rod 362 and a component load ramp 364 that collectively are configured so that only balance correction members 158 of common mass can be placed upon and dispensed by the vibratory feeder assembly 216. To assure sliding alignment of the balance correction member 158 is maintained during the operation of the vibratory feeder assembly 216, the component rod 362 has a component contact surface 366 that is geometrically consistent with the shape of the balance correction member 158. By assuring the balance correction members 158 remain in sliding alignment during operation of the vibratory feeder assembly 216, jamming of the vibratory feeder assembly 216 by the balance correction members 158 is precluded.

Of particular concern during the production of disc drives 100 is particulate generation. To minimize particulate generation, the vibratory feeder assembly 216 is energized only for a period of time needed to dispense a single balance correction member 158. After dispensing a balance correction member 158, the vibratory feeder assembly 216 is de-energized and remains dormant until called upon to dispense another balance correction member 158.

As shown in FIG. 11, the sliding component stop 360 has a stop body 368 with a convex component nesting portion 370. The component nesting portion 370 is configured to be consistent with the shape of the balance correction member 158 and protrudes from the stop body 368 a distance substantially equal to one-half the thickness of the balance correction member 158. The load ramp 364 has a pair of lead-in fingers 372 and a load zone 374. The lead-in fingers 372 provide a ramp to load the balance correction members 158 onto the vibratory feeder assembly 216. Balance correction members 158 slide up the lead-in fingers 372 and come to rest on the load zone 374 prior to being encouraged along the component contact surface 366 of the component rod 362 to provide a staged supply of balance correction members 158 awaiting dispensing.

The chute assembly 354 (FIG. 10) has a chute mount 376 supporting a chute weldment 378 that has a gravity feed chute 380 and a component retainer 382. A component detection sensor 384 is mounted to the component retainer 382 and detects the presence of a balance correction member 158 when contained within a component retainer 382. To accomplish dispensing of the balance correction member 158 the chute mount assembly further has a slide mount 386 attached to the chute mount 376 and supports a shutter air slide 388 that has a mounting member 390 and a slide member 392. The mounting member 390 secures the shutter air slide 388 to the slide mount 386 and a slide member 392 secures a positionable air slide activated shutter 394. When the automated disc drive assembly station 200 requires a balance correction member 158 to be dispensed, the control computer 224 activates the shutter air slide 388 which moves the air slide activated shutter 394 from a closed position to an open position thereby dispensing the balance correction member 158 from the vibratory feeder assembly 216.

The vibrator assembly 352 is shown in greater detail by FIG. 11. The primary functions of the vibrator assembly 352 are to advance the balance correction members 158 along the component contact surface 366 of the component rod 362 onto the convex component nesting portion 370 and to release the balance correction members 158 from the convex component nesting portion 370 of the sliding component stop 360 into the gravity feed chute 380.

To accomplish the release of the balance correction member 158 from the convex component nesting portion 370, a lower cylinder mount 396 is attached to the mass plate 356, the lower cylinder mount 396 supporting a component wiper 398 and a component stop air slide 400. The sliding component stop 360 is attached to the component stop air slide 400. The component wiper 398 is configured to allow passage of the stop body 368 through a stop body aperture 399 when the component stop air slide 400 is activated by the control computer 224. The component stop air slide 400 has an attachment portion 402 that connects the component stop air slide 400 to the lower cylinder mount 396 and a linear placement portion 404 that connects the sliding stop body 368 to the component stop air slide 400.

The stop body 368 is initially positioned adjacent the component rod 362 in anticipation of the placement of a balance correction member 158 onto the convex component nesting portion 370 of the stop body 368. With the balance correction member 158 positioned for release the component stop air slide 400 responds to a signal from the control computer 224 by sliding the stop body 368 from a load position, i.e., contact with the component rod 362, through the stop body aperture 399 of the wiper 398. The wiper 398 wipes the balance correction member 158 off of the convex component nesting portion 370 of the stop body 368 causing the balance correction member 158 to fall into the gravity feed chute 380 of the chute weldment 378. The balance correction member 158 progresses through the gravity feed chute 380 and comes to rest on top of the shutter 394, while the component retainer 382 of the chute assembly 354 contains the balance correction member 158 by constraining the lateral movement of the balance correction member 158.

Also shown in FIG. 11 is an upper cylinder mount 406 that is attached to the lower cylinder mount 396, the upper cylinder mount 406 supporting an escapement assembly 407 that includes an escapement blade air slide 408 and having a connection portion 410 and a transport portion 412. The connection portion 410 attaches to the upper cylinder mount 406 and a transport portion 412 attaches to an escapement blade 414. In response to a signal from the control computer 224, the escapement blade air slide 408 positions the escapement blade 414 that meters the advancement of the balance correction members 158 and that allows no more than one balance correction member 158 at a time to pass from the component rod 362 onto the sliding component stop 360. When activated in response to the control computer 224 the escapement blade 414 is raised by the escapement blade air slide 408 to an open position, which allows passage of a single balance correction member 158 beneath the escapement blade 414. The balance correction member comes to rest on the convex component nesting portion 370. With the balance correction member 158 on the sliding component stop 360, the control computer 224 activates the escapement blade air slide 408 to reposition the escapement blade 414 to a closed position adjacent the component contact surface 366. Placing the escapement blade 414 in the closed position prevents advancement of additional balance correction members 158 from the component rod 362 to the sliding component stop 360 while the sliding component stop 360 is active.

The vibrator assembly 352 includes the mass plate 356, a vibration source motor mount tube 416 supported by the mass plate 356 and supporting the component key 358. The vibration source motor mount tube 416 houses a vibration source motor 418 that supplies mechanical vibration to the component key 358. The center of mass of the vibration source motor 418 is positioned substantially at mass center of the entire vibratory feeder assembly 216 to control the direction of travel of the balance correction member 158. To control mass center for the vibratory feeder, mass plate 356 is configured, based on the mass of the specific component rod assembly 357, to position the center of mass at the center of rotation of the vibration source motor 418. By positioning the vibration source motor 418 at the center of mass of the vibratory feeder assembly 216, the direction of travel of the balance correction member 158 is consistent with and controlled by the direction of the rotation of the vibration source motor 418. In addition to the vibratory source motor 416, FIG. 11 also shows a vibrator cover 420 and a rear tube cover 422 attached to the vibration source motor mount tube 416 to contain particulate matter generation during the operation of the vibration source motor 418 and a component stop 360 and escapement assembly cover 424 containing particulate matter generation during the operation vibratory feeder.

Figure 12:
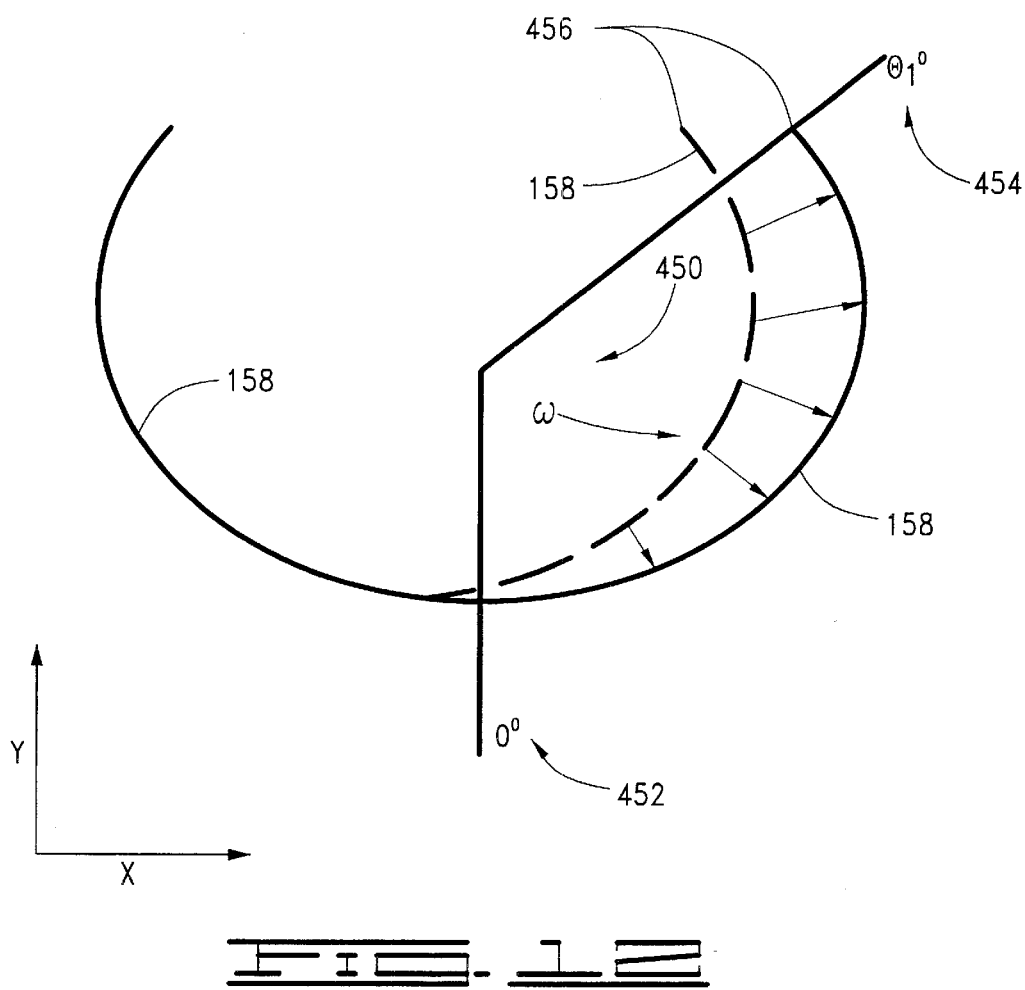
FIG. 12 is a plan view of the balance correction member of FIG. 3 in both an uninstalled configuration and a portion of one-half of the installed balance correction member in an installed configuration (shown in dashed lines).

Turning to FIG. 12, the final installed shape of the balance correction member 158 is circular. The uninstalled shape is approximately elliptical. The elliptical initial shape is determined by the following method. A linear load distribution that meets the following conditions was applied to a circular ring solution for one-half of the balance correction C-shaped wire-ring 158, that is where:

$$\omega = A\theta + B \quad \text{(Equation 1)}$$

Where A and B are constants the load ω 450 is linear at any point located at angle θ, measured from a center point 452, at 0° along the path of the balance correction member 158 between center point 452 and end point $\theta_1$ 454. FIG. 10 further shows $\theta_{1\ 454}$ as an angle measured from a center point 452 of the balance correction member 158 to an end point 456 of the balance correction member 158 encompassing one half of the balance correction member 158 where the following equation holds:

$$\frac{2}{\theta_1}\sin\theta_1 - 2B\sin\theta_1 + \frac{2\cos\theta_1}{\theta_1^2} - \frac{2B}{\theta_1}\cos\theta_1 + B\sin\theta_1 - \frac{2}{\theta_1^2} + \frac{2B}{\theta_1} = 0 \quad \text{(Equation 2)}$$

The mass of the balance correction member 158 needed to overcome an amount of imbalance present in the disc pack 142 is determined by the over length of the balance correction C-shaped wire-ring 158, hence $\theta_1$ is determined by the amount of imbalance that needs to be produced by the balance correction member 158. Computer generated empirical data has shown the total load requirement of the ring to stay in place during vertical shock is 2 lbs. or for one-half the ring (1 lb.). In solving for the load for one-half the ring where the load ω is linear with angle θ the equation is:

$$1\ \text{lb.} = \int_0^{\theta_1} \omega d\theta \quad \text{(Equation 4)}$$

Solving for B, the following equation is obtained:

$$B = \frac{\frac{-2}{\theta_1}\sin\theta_1 + \frac{2}{\theta_1^2} - \frac{2\cos\theta_1}{\theta_1^2}}{-2\sin\theta_1 - \frac{2}{\theta_1}\cos\theta_1 + \sin\theta_1 + \frac{2}{\theta_1}} \quad \text{(Equation 3)}$$

Equation 3 can be substituted into equation 2 and solved for A. With A and B known, a FEM (Finite Element Analysis) model can be created for a circular ring with the load applied as described above. The solution of the FEM model will give the initial shape.

The mass of the balance correction member 158 needed to overcome an amount of imbalance present in the disc pack 142 is determined by the over length of the balance correction C-shaped wire-ring 158, hence $\theta_1$ is determined by the amount of imbalance that needs to be produced by the balance correction member 158. Computer generated empirical data has shown the total load requirement of the ring to stay is place during vertical shock is 2 lbs. or for one half the ring (1 lb.). In solving for the load for one half the ring where the load ω is linear with angle θ the equation is:

$$1\ \text{lb.} = \int_0^{\theta_1} \omega d\theta \quad \text{(Equation 4)}$$

Substituting equation 1 for ω the equation becomes;

$$\int_0^{\theta_1}(A\theta + B)d\theta = \frac{1}{2}A\theta_1^2 + B\theta_1 \quad \text{and} \quad \text{(Equation 5)}$$

$$A = \frac{2 - 2B\theta_1}{\theta_1^2}$$

The sum of the forces in the Y direction must be zero for static equilibrium, therefore the equation is:

$$\int_0^{\theta_1} \omega \cos\theta d\theta = 0 \quad \text{(Equation 6)}$$

Substituting equation 1 for ω the equation becomes:

$$\int_0^{\theta_1}(A\theta\cos\theta + B\cos\theta)d\theta = 0 = \quad \text{(Equation 8)}$$

$$A\theta\sin\theta + A\cos\theta + B\sin\theta\big]_0^{\theta_1} = 0 =$$

$$A\theta_1\sin\theta_1 + A\cos\theta_1 + B\sin\theta_1 - A = 0$$

Substituting equation 3 for A, the equation can be solved for B and becomes:

$$\frac{2 - 2B\theta_1}{\theta_1^2}\theta_1\sin\theta_1 + \frac{2 - 2B\theta_1}{\theta_1^2}\cos\theta_1 + B\sin\theta_1 - \frac{2 + 2B\theta_1}{\theta_1^2} = 0 \quad \text{(Equation 9)}$$

The present invention provides a vibratory feeder assembly (such as 216) for advancing and dispensing a balance correction member (such as 158) corrects rotational imbalance of a disc drive (such as 100), the vibratory feeder assembly having a base (such as 350) supporting a chute assembly (such as 354) that has a gravity feed chute (such as 380), an air slide activated shutter (such as 394) and a component retainer (such as 382) for confining the balance correction member, the air slide activated shutter for dispensing the balance correction member from the component retainer. A vibrator assembly (such as 352) is supported by the base and has a vibration source motor (such as 418) is mounted at the center of mass of the vibratory feeder assembly, the vibration source motor providing energy to advance the balance correction member. A component key (such as 358) with a component rod (such as 362) and component load ramp (such as 364) is supported by the vibrator assembly and configured to accept only balance correction members of common mass. A sliding component stop (such as 360) stages each balance correction member prior to being dispensed, and an escapement blade (such as 414) precludes advancement of more than one balance correction member at a time onto the sliding component stop.

It is clear that the present invention is well adapted to attain the ends and advantages mentioned as well as those inherent therein. While a presently preferred embodiment of the invention has been described for purposes of the disclosure, it will be understood that numerous changes can be made which will readily suggest themselves to those skilled in the art. Such changes are encompassed within the spirit of the invention disclosed and as defined in the appended claims.

What is claimed is:

1. A vibratory feeder for advancing and dispensing a balance correction member correcting rotational imbalance of a disc drive, the vibratory feeder assembly comprising:
   a base;
   a vibrator assembly supported by the base advancing the balance correction member;
   a component rod assembly attached to the vibrator assembly supporting the balance correction member;
   an escapement assembly attached to the base gating advancement of the balance correction member;
   a sliding component stop attached to the escapement assembly releasing the balance correction member; and
   a chute assembly attached to the base comprising:
      a gravity feed chute receiving the balance correction member from the sliding component stop;
      a component retainer attached to the feed chute confining the balance correction member; and
      an air slide activated shutter communicating with the component retainer dispensing the balance correction member.

2. The vibratory feeder of claim 1 wherein the vibrator assembly comprises:
   a mass plate attached to the base controlling location of mass center of the vibratory feeder;
   a vibration source motor mount tube attached to the mass plate and supporting the component rod assembly; and
   a vibration source motor mounted within the vibration source motor mount tube at substantially mass center of the vibration feeder assembly.

3. The vibratory feeder of claim 1 wherein the vibrator assembly includes a mass plate attached to the base controlling location of mass center of the vibratory feeder and a vibration source motor mount tube attached to the mass plate, and wherein the component rod assembly comprises:
   a component key attached to the vibration source motor mount tube geometrically configured to accept balance correction members of substantially the same configuration and mass;
   a component rod attached to the component key substantially geometrically consistent with the shape of the balance correction member supporting and maintaining the balance correction member in sliding alignment; and
   a load ramp attached to the component rod having a pair of lead-in fingers and a load zone, the geometric shape of the load zone substantially consistent with the shape of the balance correction member aiding loading of the balance correction members onto the component rod assembly.

4. The vibratory feeder of claim 3 wherein the vibrator assembly comprises a vibration source motor mount tube, mounted between the mass plate and the component rod assembly, the motor mount tube supporting a vibration source motor at substantially mass center of the vibration feeder assembly and wherein the aligned balance correction members advance sequentially in response to the activation of the vibration source motor, the direction of balance correction member advancement determined by rotational direction of the vibration source motor.

5. The vibratory feeder of claim 4 wherein the balance correction member is a C-shaped wire-ring.

6. The vibratory feeder of claim 1 wherein the chute assembly further comprises:
   a chute mount attached to the base, the chute mount supporting the gravity feed chute and the component retainer;
   a component detection sensor mount in the component retainer detecting the presence of the balance correction member;
   a slide mount supported by the chute mount locating the air slide activated shutter relative to the component retainer; and
   a shutter air slide, affixed between the slide mount and the air slide activated shutter, to position the air slide activated shutter in an open position to dispense the balance correction member from the vibratory feeder and a closed position to restrict the balance correction member to confinement by the component retainer.

7. The vibratory feeder of claim 6 wherein the escapement assembly precludes passage of the balance correction member responsive to the air slide activated shutter in the open position and the component detection sensor detecting no balance correction member present, and wherein the escapement blade promotes passage of the balance correction member in response to positioning the air slide activated shutter in the closed position and in response to the component detection sensor detecting no balance correction member present.

8. The vibratory feeder of claim 1 wherein the vibrator assembly includes a mass plate attached to the base controlling location of mass center of the vibratory feeder, and wherein the escapement assembly comprises:
   a lower cylinder mount attached to the mass plate;
   an upper cylinder mount attached to the lower cylinder mount; and
   an escapement blade air slide supporting an escapement blade affixed to the upper cylinder mount gating advancement of the balance correction member by positioning the escapement blade in contact with the balance correction member then allowing passage of the balance correction member by retracting the escapement blade from contact with the balance correction member.

9. The vibratory feeder of claim 1 wherein the vibrator assembly includes a mass plate attached to the base controlling location of mass center of the vibratory feeder, wherein the escapement assembly includes a lower cylinder mount attached to the mass plate and wherein the sliding component stop comprises:
   a component stop air slide affixed to the lower cylinder mount;
   a stop body attached to the component stop air slide, the component stop air slide positioning the stop body in contact with component rod assembly receiving the balance correction member from the escapement assembly and retracting the stop body from contact with the component rod assembly releasing the balance correction member; and
   a component wiper attached to the lower cylinder wiping the balance correction member from stop body in response to the component stop air slide retracting the stop body from contact with the component rod assembly.

10. The vibratory feeder of claim 9 wherein the stop body provides a convex component nesting portion, the convex component nesting portion substantially configured to the shape of the balance correction member and extending from the stop body substantially one-half the thickness of the balance correction member, the convex component nesting portion supporting the balance correction member prior to release of the balance correction member by the sliding component stop.

11. A disc drive with a balance corrected disc pack having a spindle motor with an attached hub supporting a clampring with an annular balance correction containment cavity and a balance correction member disposed therein, the balance correction member dispensed by steps comprising:
(a) advancing the balance correction member along a component rod of a vibratory feeder;
(b) loading the balance correction member onto a component stop;
(c) constraining advancement of subsequent aligned balance correction members with an escapement assembly:
(d) moving the component stop to a delivery position;
(e) releasing the balance correction member to a chute assembly;
(f) verifying the presence of the balance correction member with a component detection sensor; and
(g) dispensing the balance correction member.

12. The disc drive of claim 11 wherein the component rod has a component contact surface geometrically consistent with the shape of the balance correction member, the component rod supporting a plurality of slidingly aligned balance correction members.

13. The disc drive of claim 12 wherein the component stop has a stop body and a convex component nesting portion formed substantially consistent with the shape of the shape of the balance correction member and protruding from the stop body substantially one-half the thickness of the balance correction member, the convex component nesting portion supporting the balance correction member.

14. The disc drive of claim 13 wherein the vibratory feeder comprises a vibration source motor mount tube supporting a vibration source motor at substantially mass center of the vibration feeder and wherein the aligned balance correction members advance sequentially in response to the activation of the vibration source motor, the direction of balance correction member advancement determined by rotational direction of the vibration source motor.

15. The disc drive of claim 14 wherein the balance correction member is a C-shaped wire-ring formed from a uniform stainless steel wire hardened to full hard maintaining the formed shape and providing a load force in response to applied compressive forces, and wherein mass of the C-shaped wire-ring is determined by the length of the uniform stainless steel wire.

16. A disc drive comprising:
a disc pack with a balance correction member; and
means for dispensing the balance correction member.

* * * * *